United States Patent
Guo et al.

(10) Patent No.: US 11,680,477 B1
(45) Date of Patent: Jun. 20, 2023

(54) METHODS AND SYSTEMS FOR DETERMINING CAVING VOLUME ESTIMATION FOR USE IN DRILLING OPERATIONS

(71) Applicant: Halliburton Energy Services, Inc., Houston, TX (US)

(72) Inventors: Yonggui Guo, Houston, TX (US); Claudia Lucia Bonin de Oliveira, Fort Bend, TX (US); Dale E. Jamison, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/562,359

(22) Filed: Dec. 27, 2021

(51) Int. Cl.
| | |
|---|---|
| *E21B 47/003* | (2012.01) |
| *G01F 17/00* | (2006.01) |
| *G01B 11/22* | (2006.01) |
| *G01B 11/28* | (2006.01) |
| *G01B 11/26* | (2006.01) |

(Continued)

(52) U.S. Cl.
CPC ............ *E21B 47/003* (2020.05); *E21B 45/00* (2013.01); *E21B 47/002* (2020.05); *E21B 47/022* (2013.01); *E21B 47/09* (2013.01); *G01B 11/22* (2013.01); *G01B 11/24* (2013.01); *G01B 11/26* (2013.01); *G01B 11/28* (2013.01); *G01F 17/00* (2013.01); *G01V 11/002* (2013.01); *E21B 2200/20* (2020.05)

(58) Field of Classification Search
CPC ...... E21B 47/003; E21B 47/022; E21B 47/09; E21B 2200/22; G01B 11/22; G01B 11/26; G01B 11/28; G01B 11/002
See application file for complete search history.

(56) References Cited

U.S. PATENT DOCUMENTS

| | | | |
|---|---|---|---|
| 6,179,069 B1 | 1/2001 | Zheng | |
| 7,003,439 B2 * | 2/2006 | Aldred | E21B 44/00 |
| | | | 175/45 |

(Continued)

FOREIGN PATENT DOCUMENTS

| | | |
|---|---|---|
| WO | 2013112398 A1 | 8/2013 |
| WO | 2015051027 A1 | 4/2015 |

OTHER PUBLICATIONS

PCT App. No. PCT/US2022/051485, "International Search Report and the Written Opinion", dated Apr. 11, 2023, 10 pages.

*Primary Examiner* — Tara Schimpf

(74) *Attorney, Agent, or Firm* — Kilpatrick Townsend & Stockton LLP

(57) ABSTRACT

Methods and systems for determining caving volume estimations based on logging data and geomechanical models are provided. For example, a system can receive image log data measured during a drilling operation in a wellbore. The system can receive an identification of a breakout in a subterranean formation around the wellbore. The system can determine, using the image log data, a breakout angular width for the breakout. The system can determine a breakout depth for the breakout. The system can determine a caving volume based on the breakout depth and the breakout angular width substantially contemporaneously with the drilling operation. The system can output the caving volume estimation for use in substantially contemporaneously adjusting a drilling parameter for the drilling operation.

20 Claims, 8 Drawing Sheets

(51) Int. Cl.
*E21B 45/00* (2006.01)
*E21B 47/002* (2012.01)
*E21B 47/022* (2012.01)
*G01V 11/00* (2006.01)
*G01B 11/24* (2006.01)
*E21B 47/09* (2012.01)

(56) References Cited

U.S. PATENT DOCUMENTS

| | | | |
|---|---|---|---|
| 7,966,874 B2 * | 6/2011 | Hassan | E21B 47/095 |
| | | | 702/9 |
| 11,091,989 B1 | 8/2021 | De Oliveira et al. | |
| 2004/0138818 A1 | 7/2004 | Shray et al. | |
| 2009/0185446 A1 | 7/2009 | Zheng et al. | |
| 2017/0030187 A1 * | 2/2017 | Fulton | E21B 47/10 |
| 2017/0314382 A1 * | 11/2017 | Torrione | E21B 47/10 |
| 2019/0032475 A1 * | 1/2019 | Zheng | E21B 47/022 |
| 2019/0120041 A1 * | 4/2019 | Avasarala | G01N 29/225 |
| 2020/0116005 A1 * | 4/2020 | Li | E21B 47/09 |
| 2020/0400015 A1 * | 12/2020 | Ge | E21B 47/08 |

* cited by examiner

METHODS AND SYSTEMS FOR DETERMINING CAVING VOLUME ESTIMATION FOR USE IN DRILLING OPERATIONS

TECHNICAL FIELD

The present disclosure relates generally to wellbore drilling operations and, more particularly (although not necessarily exclusively), to estimating caving volumes for use in wellbore drilling operations.

BACKGROUND

A wellbore may be drilled into a subterranean formation to recover natural resources including oil, gas, or water. Conditions in the wellbore, including a stress state and stability of the surrounding subterranean formation, can be influenced by in-situ stresses and drilling parameters. Drilling operations, depending on drilling parameters, can change the stress state of the surrounding subterranean formation, and can cause events such as wellbore failures. For example, the stress of the subterranean formation may exceed the shear strength limit of the subterranean formation, causing a breakout. The breakout induced by wellbore shear failure may cause sections of the surrounding subterranean formation to spall off and produce cavings. The cavings can enter drilling fluid in the wellbore. Excessive caving volume may cause severe drilling problems, such as stuck pipe.

DETAILED DESCRIPTION

Figure 1:
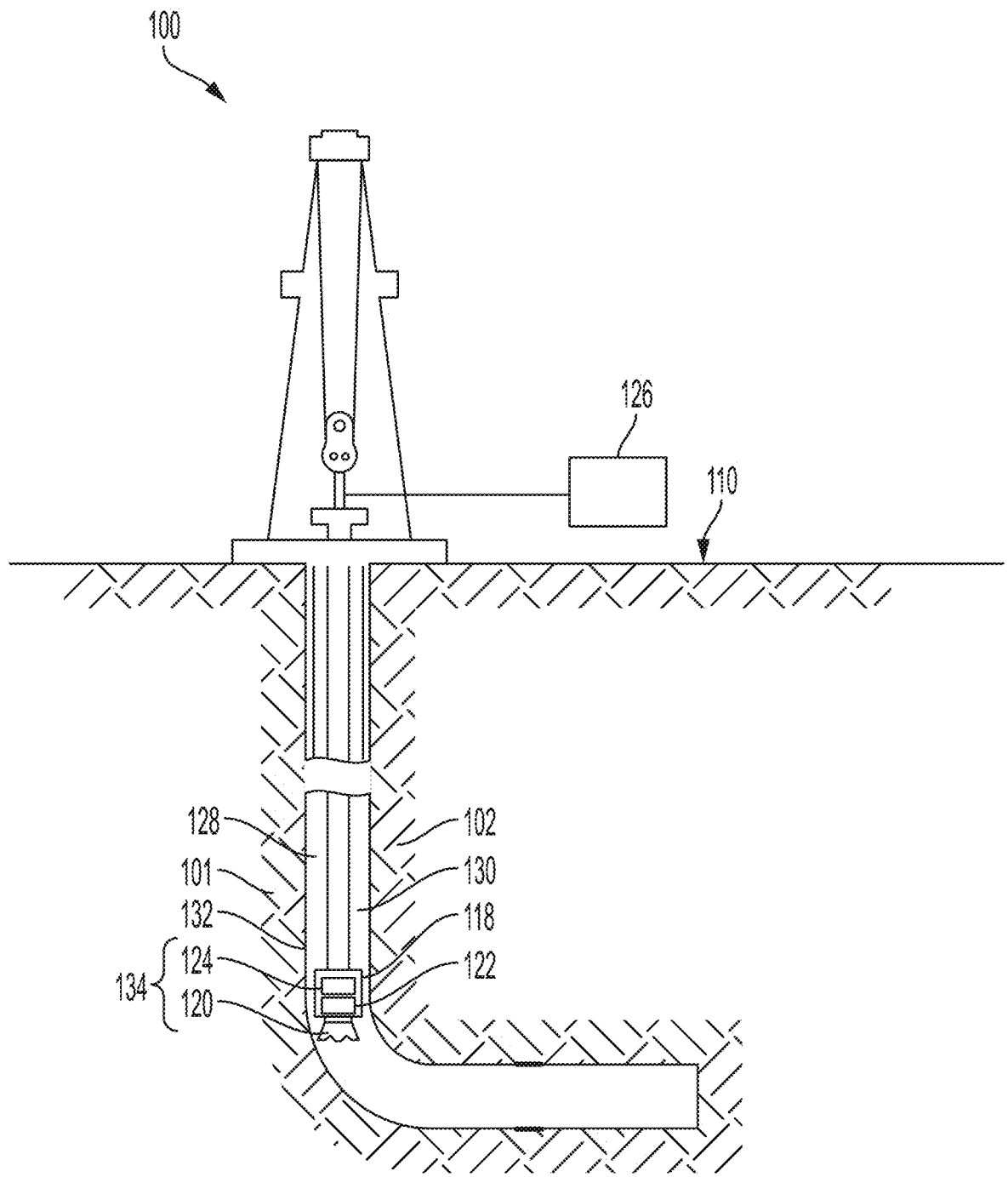
FIG. 1 is a schematic diagram of a drilling rig for drilling a wellbore into a subterranean formation according to one example of the present disclosure.

Certain aspects and features of the present disclosure relate to estimating caving volume using logging data acquired from a wellbore in real-time (e.g., substantially contemporaneously with a drilling operation in the wellbore) and performing geomechanical analysis in real time to estimate the caving volume. The caving volume estimation is a determination of the volume of rock that breaks away from the subterranean formation due to a breakout around the wellbore wall that experiences shear failure. The disclosure also relates to outputting the caving volume combined with drilling data for use in adjusting drilling parameters during the wellbore drilling operation to minimize drilling risks. A caving volume can be a volume of rock that may have experienced shear failure and fallen from wellbore wall and may be present in a drilling fluid in the wellbore. The caving volume may affect drilling conditions in the wellbore, such as effective circulating density, leading to drilling problems.

By determining caving volume estimations in real time and outputting the estimations to be used in adjusting drilling parameters while drilling operations are performed, drilling risks and unproductive time may be minimized and drilling efficiency may be improved. The drilling data may be acquired in real-time and may include torque data, drag data, weight-on-bit data, equivalent circulating density data, rate of penetration data, rotations per minute, pressure while drilling data, standpipe pressure data, pump rate data, drilling events data, solid volume at surface data, or any combination thereof. The logging data may be collected in real-time and may include gamma ray log data, sonic log data, resistivity log data, image log data, caliper log data, density log data, or any combination thereof. Drilling parameters that may be modified based on the outputted caving volume prediction may include drilling fluid density, rotations per minute, a pump rate, a lubrication concentration, a loss circulation material volume, a rate of penetration, a weight on bit, an azimuth inclination, a well trajectory, or any combination thereof.

In one particular example, estimating caving volume can be based on a general observation that breakouts are distinguishable features on image logs. The breakouts can occur in pairs that are 180 degrees apart and symmetric along the direction of the minimum principal stress. Breakout angular width can be measured from an image log, while breakout depth can be determined from a caliper log. The image log data may be received from a digital sensor, such as an optical sensor or an acoustic sensor, while the caliper data may be collected from a downhole logging tool, such as an acoustic caliper or a mechanical caliper.

Breakout shape on wellbore cross sections may be approximated as part of an ellipse. The area of the breakout for each cross section can be calculated using the breakout angular width and the maximum depth that are determined from real-time image logs and caliper logs, respectively. Thus, the caving volume can be estimated if breakout angular width and the maximum depth does not change over well depth.

In some examples, caving volume estimations can be determined by dividing an image log into small intervals so that breakout angular width and the maximum wellbore size in each interval are constant. The breakout angular width can be determined from the image log for each interval. In some examples, the breakout angular width can be determined manually by visually inspecting the breakout boundary on the image log. Alternatively or additionally, the breakout angular width can be determined automatically using an edge detecting computer program. The maximum breakout depth for each interval can be determined from a caliper log. For example, a difference between a bit size of a drilling bit and the maximum caliper measurement within any given interval can represent the maximum breakout depth for the interval. The breakout angular width and breakout depth can be used to determine the area for each interval. The caving volume for the entire breakout can be estimated by summing the areas of each interval.

In other examples, caving volumes can be estimated based on the shear failure analysis of discretized wellbore using Kirsch's equations combined with any failure criterion. The combination of the Kirsch's equation and any appropriate rock failure criterion can allow both breakout angular width and depth to be determined. This is done by determining stress around wellbore using the Kirsch's equation and evaluating rock shear failure based on an applied failure criterion, such as the Mohr Coulomb failure criterion.

The caving volume estimation may be output for use in determining an adjustment to a drilling operation in the wellbore. For example, the caving volume estimation may be used to determine an average solid concentration of solids in drilling fluid. The average solid concentration may be determined using the following equation:

$$\text{Average Solid Concentration (\%)} = 100*(\text{Caving volume} + \text{Cutting volume} - \text{Solid volume at surface})/(\text{Cutting volume} + \text{Caving Volume}). \quad (1)$$

In some examples, the cutting volume may be determined in real time via cutting transport algorithms and tracking mechanisms. In other examples, logging data available in real time may provide a depth and a time indication of the cavings for determining the caving volume. In some examples, the average solid concentration may be used to adjust a mud weight or a rate of penetration.

In some examples, the caving volume prediction may be used to determine if a stuck pipe may be induced by excessive caving volume. If it can be determined that a stuck pipe may be induced by excessive caving volume, drilling fluid density may be adjusted to reduce likelihood of the borehole collapse. In some examples, a geomechanical model of the wellbore may be calibrated with the caving volume estimation. The updated geomechanical model may be used to predict a borehole condition depending on the mud weight. In cases where wellbore stability is a concern and effective circulating density cannot be increased, the well trajectory may be adjusted to drill in a different direction.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic diagram of a drilling rig 100 for drilling a wellbore 102 into a subterranean formation 101 according to one example of the present disclosure. In this example, a drilling rig 100 is depicted for a well, such as an oil or gas well, for extracting fluids from a subterranean formation 101. The drilling rig 100 may be used to create a wellbore 102 from a surface 110 of the subterranean formation 101. The drilling rig 100 may include a well tool or downhole tool 118, and a drill bit 120. The downhole tool 118 can be any tool used to gather information about the wellbore 102. For example, the downhole tool 118 can be a tool used for measuring-while-drilling or logging-while-drilling operations. The downhole tool 118 can include a sensor 122 for collecting wellbore data. Examples of wellbore data can include rate of penetration, weight on bit, standpipe pressure, depth, mud weight, rotations per minute, torque, equivalent circulating density, or other parameters. The downhole tool 118 can also include a transmitter 124 for transmitting data from the sensor 122 to the surface 110. A bottom hole assembly 134 can include the downhole tool 118 and the drill bit 120 for drilling the wellbore 102.

The wellbore 102 is shown as being drilled from the surface 110 and through the subterranean formation 101. As the wellbore 102 is drilled, drilling fluid can be pumped through the drill bit 120 and into the wellbore 102 to enhance drilling operations. As the drilling fluid enters into the wellbore, the drilling fluid circulates back toward the surface 110 through a wellbore annulus 128, which is an area between a drill string 130 and a wall 132 of the wellbore 102. In some examples, shear stress on the subterranean formation 101 may cause a breakout in the subterranean formation 101 surrounding the wellbore 102 because of inappropriate drilling parameters, such as low mud weight. Cavings from the breakout may enter the drilling fluid. The sensor 122 may collect data, such as image log data or caliper log data, relating to the breakout.

Also included in the schematic diagram is a computing device 126. The computing device 126 can be communicatively coupled to the downhole tool 118 and receive real-time information about the drilling operation. The computing device 126 can determine a caving volume prediction using data received from the sensor 122. In some examples, the computing device 126 may determine adjustments to parameters for the drilling operation in real-time.

Figure 2:
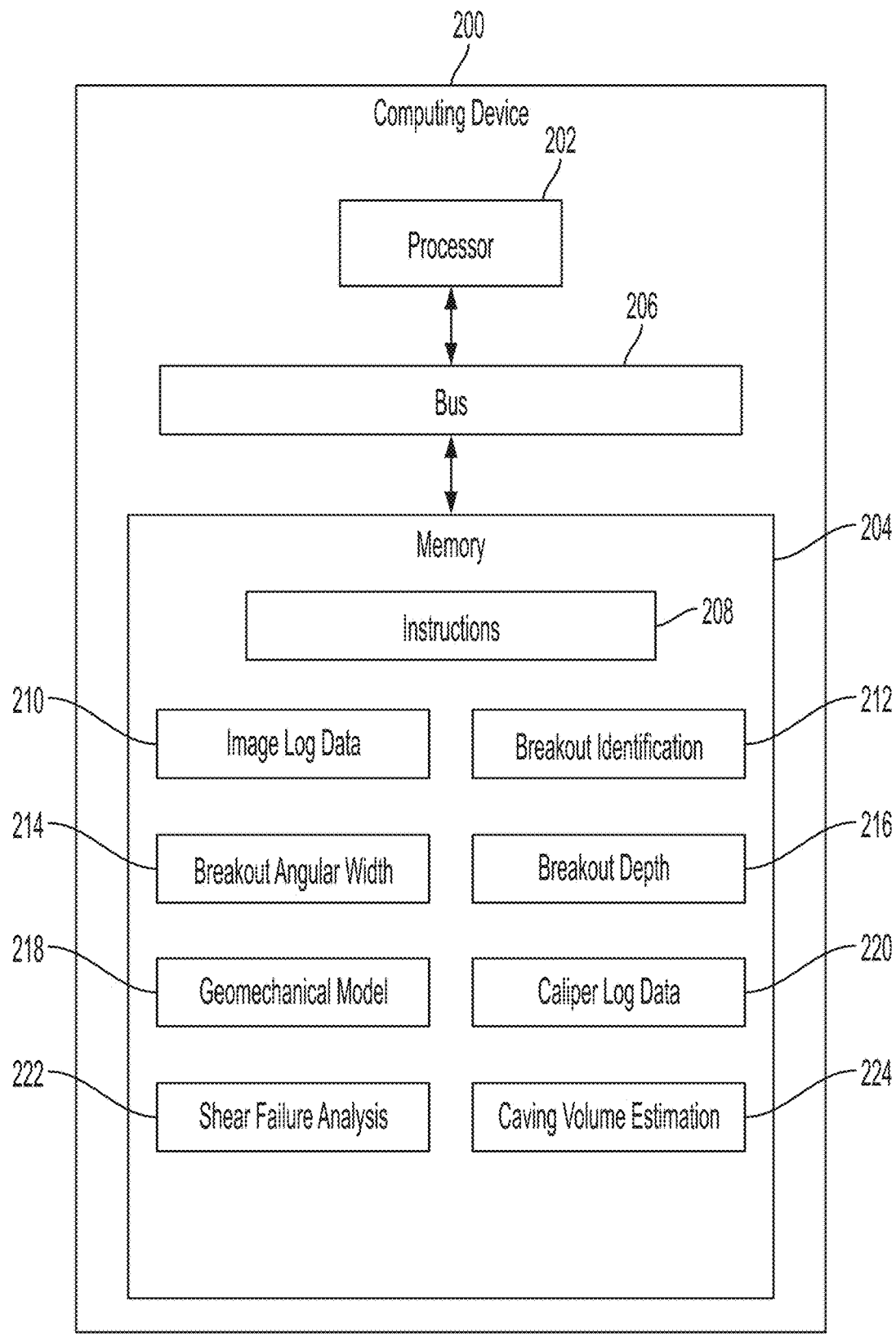
FIG. 2 is a block diagram of a computing device for determining caving volume estimations according to one example of the present disclosure.

FIG. 2 is a block diagram of a computing device 200 for determining caving volume estimations 224 according to one example of the present disclosure. The computing device 200 can include a processor 202, a bus 206, and a memory 204. In some examples, the components shown in FIG. 2 can be integrated into a single structure. For example, the components can be within a single housing with a single processing device. In other examples, the components shown in FIG. 2 can be distributed (e.g., in separate housings) and in electrical communication with each other using various processors. It is also possible for the components to be distributed in a cloud computing system or grid computing system.

The processor 202 can execute one or more operations for receiving real-time data and determining a caving volume prediction. The processor 202 can execute instructions stored in the memory 204 to perform the operations. The processor 202 can include one processing device or multiple processing devices. Examples of the processor 202 can include a field-programmable gate array ("FPGA"), an application-specific integrated circuit ("ASIC"), a processor, a microprocessor, etc.

The processor 202 is communicatively coupled to the memory 204 via the bus 206. The memory 204 may include any type of memory device that retains stored information when powered off. Examples of the memory 204 can include electrically erasable and programmable read-only memory ("EEPROM"), flash memory, or any other type of non-volatile memory. In some examples, at least some of the memory 204 can include a non-transitory medium from which the processor 202 can read instructions 208. A computer-readable medium can include electronic, optical, magnetic, or other storage devices capable of providing the processor 202 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions 208 can include processing device-specific instructions generated by a compiler or an interpreter from code written in any suitable computer-programming language, including, for example, C, C++, C#, etc.

The processor 202 may execute the instructions 208 to determine a caving volume estimation 224 based on real-time data or a geomechanical model 218. For example, the processor 202 may receive logging data such as image log data 210. The image log data 210 can be measured in real time, such as from the sensor 122. The processor 202 may also receive a breakout identification 212 regarding a breakout in the subterranean formation 101 around the wellbore 102. The processor 202 may determine a breakout angular width 214 for the breakout using the image log data 210. The processor 202 may determine a breakout depth 216 using the caliper log data 220. Alternatively or additionally, the processor 202 may determine the breakout depth 216 using the geomechanical model 218 if the caliper measurement is not reliable. The processor 202 can determine a caving volume estimation 224 using the breakout angular width 214 and the breakout depth 216. In some examples where real-time data is unavailable, the processor 202 may perform the shear failure analysis 222 using a geomechanical model 218 of the wellbore 102 to determine the caving volume estimation 224.

Figure 3:
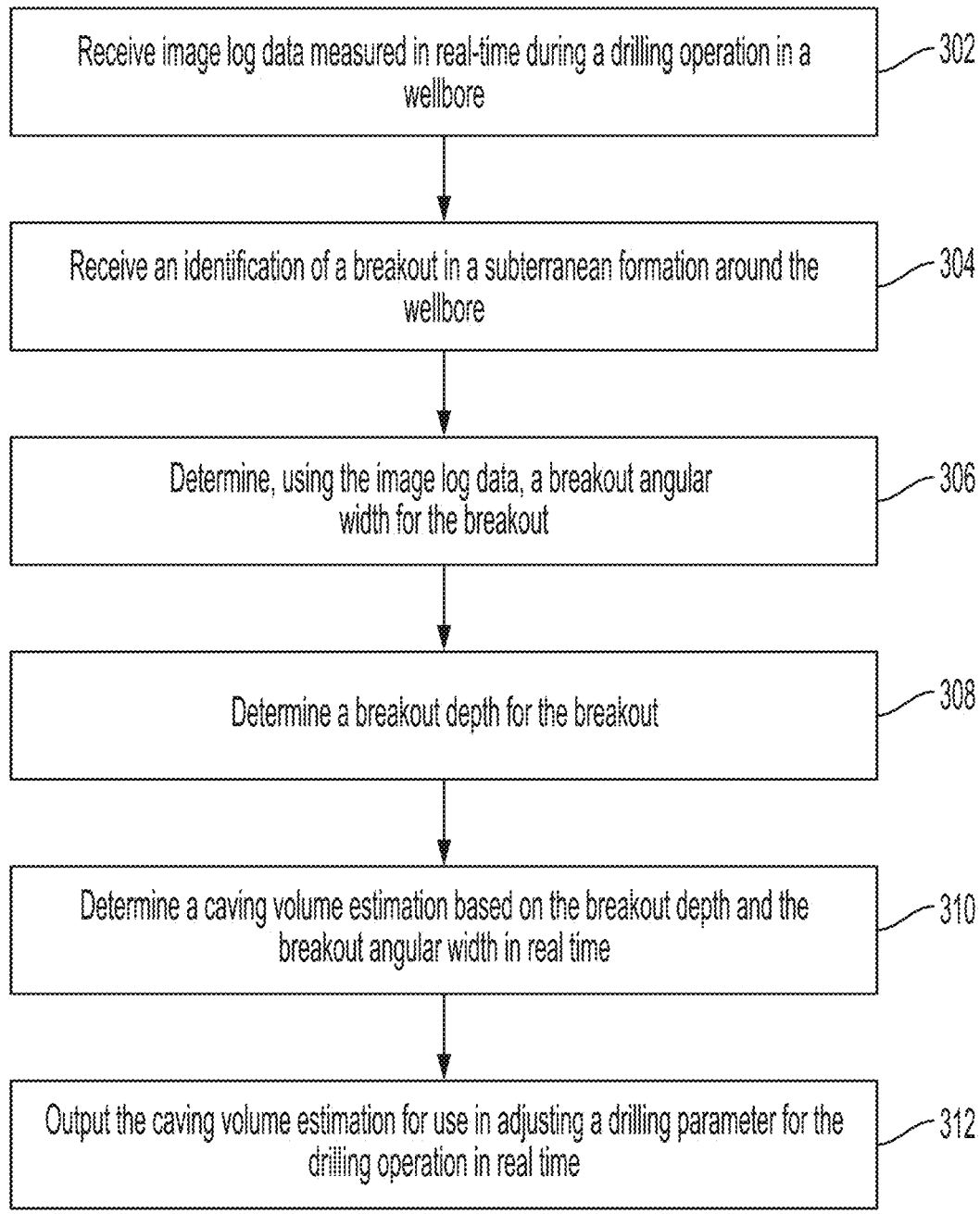
FIG. 3 is a flowchart of a method for determining a caving volume estimation according to one example of the present disclosure.

FIG. 3 is a flowchart of a method for determining a caving volume estimation 224 in real time using image log data 210 according to one example of the present disclosure. In block 302, a processor 202 can receive image log data 210 measured in real-time during a drilling operation in a wellbore 102. The image log data 210 may be received from the sensor 122. In some examples, the processor 202 may receive additional drilling data or logging data, such as caliper log data 220.

Figure 4:
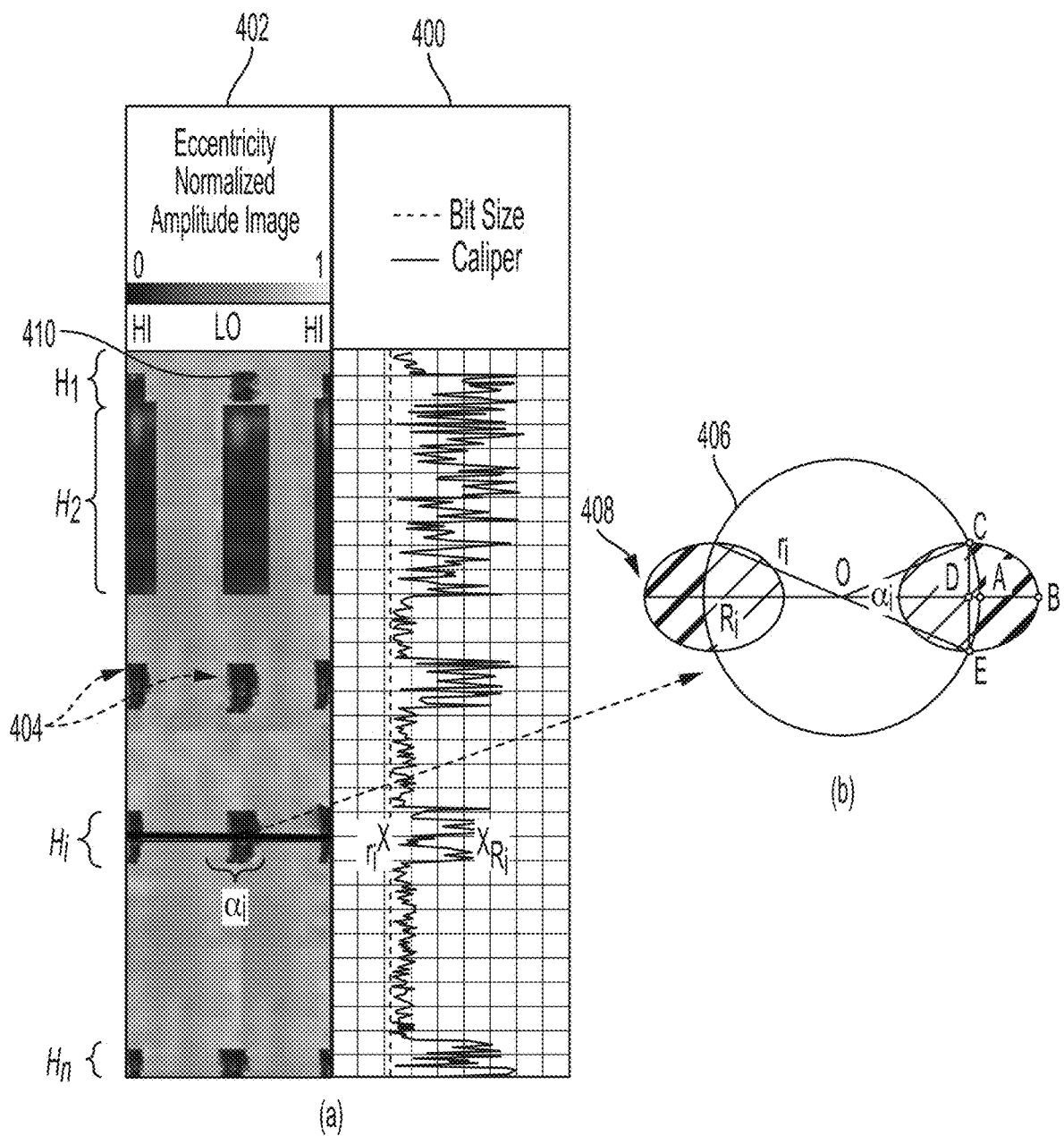
FIG. 4 is a diagram of a caliper log and an image log according to one example of the present disclosure.

FIG. 4 is a diagram of a caliper log 400 and an image log 402 according to one example of the present disclosure. Both the caliper log 400 and the image log 402 can be collected in real time during a drilling operation in the wellbore 102 by the sensor 122. The breakout 404 may occur in a pair around the wellbore 102.

Referring back to FIG. 3, in block 304, the processor 202 can receive an identification of a breakout 404 in a subterranean formation 101 around the wellbore 102. In some examples, the breakout identification 212 may be performed manually by inspecting the image log 402. In some examples, the breakout identification 212 may be performed automatically by the processor 202 executing a boundary detection program. The boundary detection program may be able to identify the boundary 410 in the image log 402 by detecting a discontinuity in an amplitude of a signal received from the sensor 122. The processor 202 may divide the wellbore 102 into n number of intervals, where n is a positive integer, so that stress, pore pressure, and rock mechanical properties in each interval can be constant. Dividing the wellbore into intervals may allow a width and depth of the breakout to remain constant along a longitudinal axis of the wellbore within each interval $H_i$. Each interval of the wellbore can have a height $H_i$.

In block 306, the processor 202 can determine, using image log data 210, a breakout angular width 214 for the breakout 404. Referring back to FIG. 4 section (b), the shape of breakout 404 in the cross section of a given interval can be in the shape of an ellipse with semi-major and semi-minor axes that are BD and CD, respectively. O is the center of the borehole and A is the middle point of the breakout 404. The breakout angular width 214 arc CAE, or $\alpha_i$, can be measured from the image log 402. The breakout 404 may occur paired with a second breakout that can appear on an opposite side of a surface of the wellbore, as depicted in FIG. 5.

Figure 5:
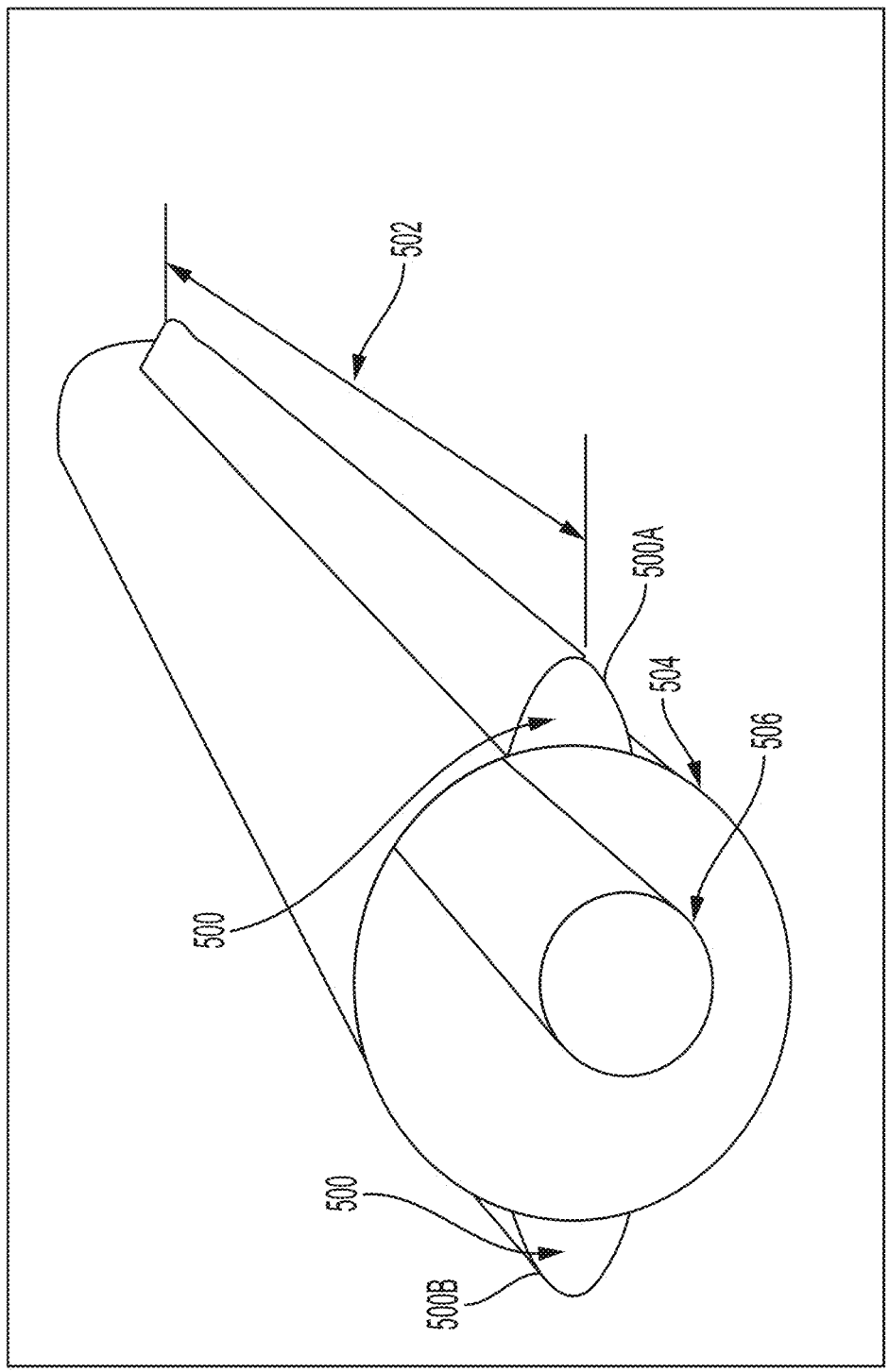
FIG. 5 is a diagram of a wellbore with breakouts according to one example of the present disclosure.

FIG. 5 is a diagram of a wellbore 504 with breakouts 500A-B according to one example of the present disclosure. The wellbore 504 may be drilled into a subterranean rock formation (e.g., subterranean formation 101). The wellbore 504 may encapsulate a length of drill string 506. The breakouts 500A-B may have a breakout length 502, which can be extracted from logging data, such as the image log data 210 or the caliper log data 220. In some examples, the breakouts 500A-B may form in a high stress and low strength interval due to low mud weight in the interior of the wellbore. The breakouts 500A-B may cause changes in wellbore conditions, such as increased solids in the drilling fluid due to cavings from the breakout entering the drilling fluid.

Referring back to FIG. 3, in block 308, the processor 202 can determine a breakout depth 216 for the breakout. For example, the processor 202 can determine the breakout depth 216 for an interval to be a difference between a maximum wellbore size $R_i$ and a bit size, or intact borehole size, $r_i$. In block 310, the processor 202 can determine a caving volume estimation 224 based on the breakout depth 216 and the breakout angular width 214 in real time. For example, the caving volume estimation 224 may be calculated by calculating a breakout area A for each interval using the following equation:

$$A_i = \pi^*(R_i - \cos(\alpha_i/2)^* r_i)^* \sin(\alpha_i/2)^* r_i - \pi^* r_i^{2*}(\alpha_i/180) + 2^* \sin(\alpha_i/2)^* \cos(\alpha_i/2)^* r_i^2 \quad (2)$$

The product of the area $A_i$ and breakout height $H_i$ yields the caving volume estimation V for the interval:

$$V_i = H_i^* A_i = H_i^*[\pi^*(R_i - \cos(\alpha_i/2)^* r_i)^* \sin(\alpha_i/2)^* r_i - \pi^* r_i^{2*}(\alpha_i/180) + 2^* \sin(\alpha_i/2)^* \cos(\alpha_i/2)^* r_i^2] \quad (3)$$

Thus, the sum of caving volume estimations $V_i$ or all the intervals gives the caving volume estimation 224 of entire wellbore:

$$V = \Sigma_{i=1}^{n}[\pi^*(R_i - \cos(\alpha_i/2)^* r_i)^* \sin(\alpha_i/2)^* r_i - \pi^* r_i^{2*}(\alpha_i/180) + 2^* \sin(\alpha_i/2)^* \cos(\alpha_i/2)^* r_i^2]^* H_i \quad (4)$$

In some examples, the processor 202 can also receive drilling data and logging data for use in determining the caving volume estimation 224. The drilling data can include torque data, drag data, weight-on-bit data, equivalent circulating density data, rate of penetration data, rotations per minute, pressure while drilling data, standpipe pressure data, pump rate data, drilling events data, and solid volume at surface data. The logging data can include gamma ray log data, sonic log data, resistivity log data, and density log data.

In block 312, the processor 202 can output the caving volume estimation 224 for use in adjusting a drilling parameter for the drilling operation in real time. For example, the drilling parameter to be adjusted may include, but are not limited to drilling fluid density, rotations per minute, a pump rate, a lubrication concentration, a loss circulation volume, a rate of penetration, a weight on bit, an azimuth inclination, a well trajectory, or any combination thereof. In some examples, a geomechanical model 218 of the wellbore 102 may be updated with real time stress, pore pressure and log measurements. The updated geomechanical model 218 may be also used to determine adjustments to the drilling parameters.

Figure 6:
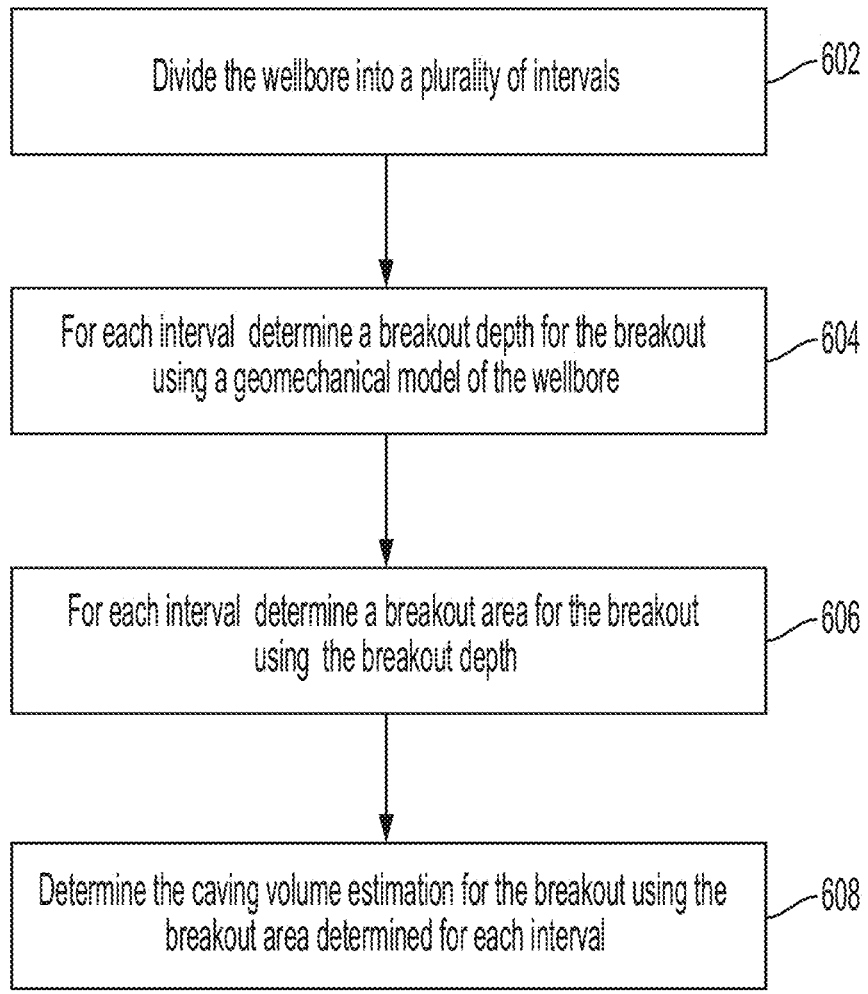
FIG. 6 is a flowchart of another method for determining a caving volume estimation according to one example of the present disclosure.

In some examples, the caving volume estimation 224 may be determined using a geomechanical model 218 additionally or alternatively to using logging data. FIG. 6 is a flowchart of another method for determining a caving volume estimation 224 according to one example of the present disclosure. At block 602, the processor 202 divides the wellbore 102 into a plurality of intervals.

Figure 7:
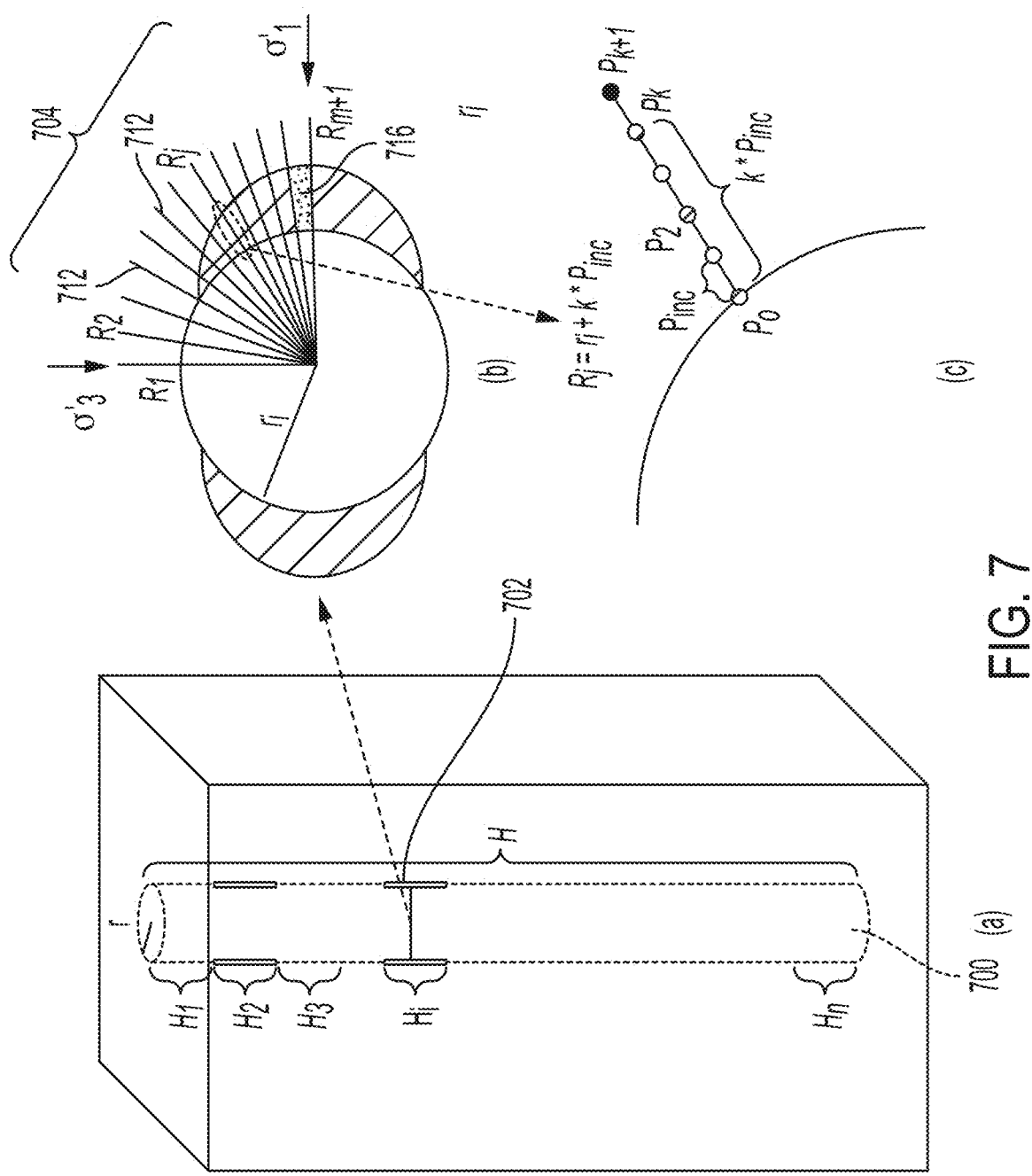
FIG. 7 is a diagram of a breakout around a wellbore used to determine a caving volume estimation according to one example of the present disclosure.

For example, FIG. 7 is a diagram of a breakout around a wellbore 700 used to determine a caving volume estimation 224. As depicted in section (a), the wellbore 700 can be divided into n number of intervals, where n is a positive integer, so that stress, pore pressure, and rock mechanical properties in each interval can be constant. Dividing the wellbore 700 into intervals may allow the depth and the width of the breakout to remain constant along a longitudinal axis of the wellbore 700 within each interval. Each interval of the wellbore 700 can have a height $H_i$. Additionally, as depicted in section (b), the cross-section of the wellbore 700 at each interval can be divided into four regions 704 along the directions of the maximum ($\sigma_1$) and minimum principal stresses ($\sigma_3$). Breakouts in the four regions 704 can be expected to be the same in terms of their shape and volume. This is because both stress state and rock mechanical properties can be homogenous within the wellbore interval $H_i$, and the breakouts can be symmetric along both the directions of the maximum ($\sigma_1$) and minimum principal stresses ($\sigma_3$). Thus, only the analysis of breakout in one region may be used to estimate the caving volume of the entire wellbore. The region 704 can be split into m equal sectors, where m is a positive integer, with m+1 rays from the center of the cross section so that the arc of each sector at wellbore wall can be approximated by a line segment and the shape of each sector, e.g. segment 716. The rays outside of the wellbore 700 can be divided into small intervals with a length of $P_{inc}$. The point $P_k$ can represent a furthest point away from the wellbore wall at which rock can experience shear failure, where k is a positive integer.

Referring back to FIG. 6, at block 604, for each interval the processor 202 can determine a breakout depth 216 for the breakout using a geomechanical model 218 of the wellbore. For example, as depicted in section (b) of FIG. 7, points on each ray 712 can be defined starting from wellbore wall and can be evenly distributed along the ray 712. The distance between any adjacent points $P_{inc}$ can be small such that a slight increase in distance may not affect the caving volume estimation 224. Shear failure at each point can be evaluated sequentially using Kirsch's equations or any appropriate failure criterion, starting from $P_0$ at wellbore wall. The evaluation can continue until no shear failure may be predicted at $P_{k+1}$. Thus, a breakout depth 702 ($BD_j$) along the ray 712 $R_j$ can be estimated using the following equation:

$$BD_j = k * P_{inc} \tag{5}$$

Referring back to FIG. 6, at block 606, for each interval the processor 202 determines a breakout area using the breakout depth 702. For example, if the length the ray $R_1$ depicted in section (c) of FIG. 7 is defined as:

$$R_j = r + BD_j = r + k * P_{inc} \tag{6}$$

then the breakout area A of the wellbore interval $H_i$ can be determined using Eqn. 6 by assuming that the shape of segment 716 is a portion of the breakout. Although the difference between the two radii of any sector $R_j$ and $R_{j+1}$ is expected to be small, their averaged length $(R_j+R_{j+1})/2$ can be used to determine the outer radius of the breakout to ensure the accuracy of the area calculation. The breakout area A of the entire wellbore within the wellbore interval $H_i$ is the sum of all sector areas in the four regions.

$$A_i = \Sigma_{j=1}^{m}(\pi*\{[(R_j+R_{j+1})/2]^2 - r_i^2\})/m \tag{7}$$

Referring back to FIG. 6, at block 608 the processor 202 determines the caving volume estimation 224 for the breakout using the breakout area determined for each interval. For example, the caving volume estimation $V_i$ of the wellbore interval $H_i$ can be calculated using the breakout area A:

$$V_i = H_i * A_i = H_i * \Sigma_{j=1}^{m}(\pi*\{[(R_j+R_{j+1})/2]^2 - r_i^2\}/m \tag{8}$$

Thus, the caving volume estimation 224, or V, of entire wellbore can be determined by summing the caving volume estimations for each wellbore interval:

$$V = \Sigma_{i=1}^{n}\Sigma_{j=1}^{m}(\pi\{[(R_j+R_{j+1})/2]^2 - r_i^2\}) * H_i/m \tag{9}$$

Figure 8:
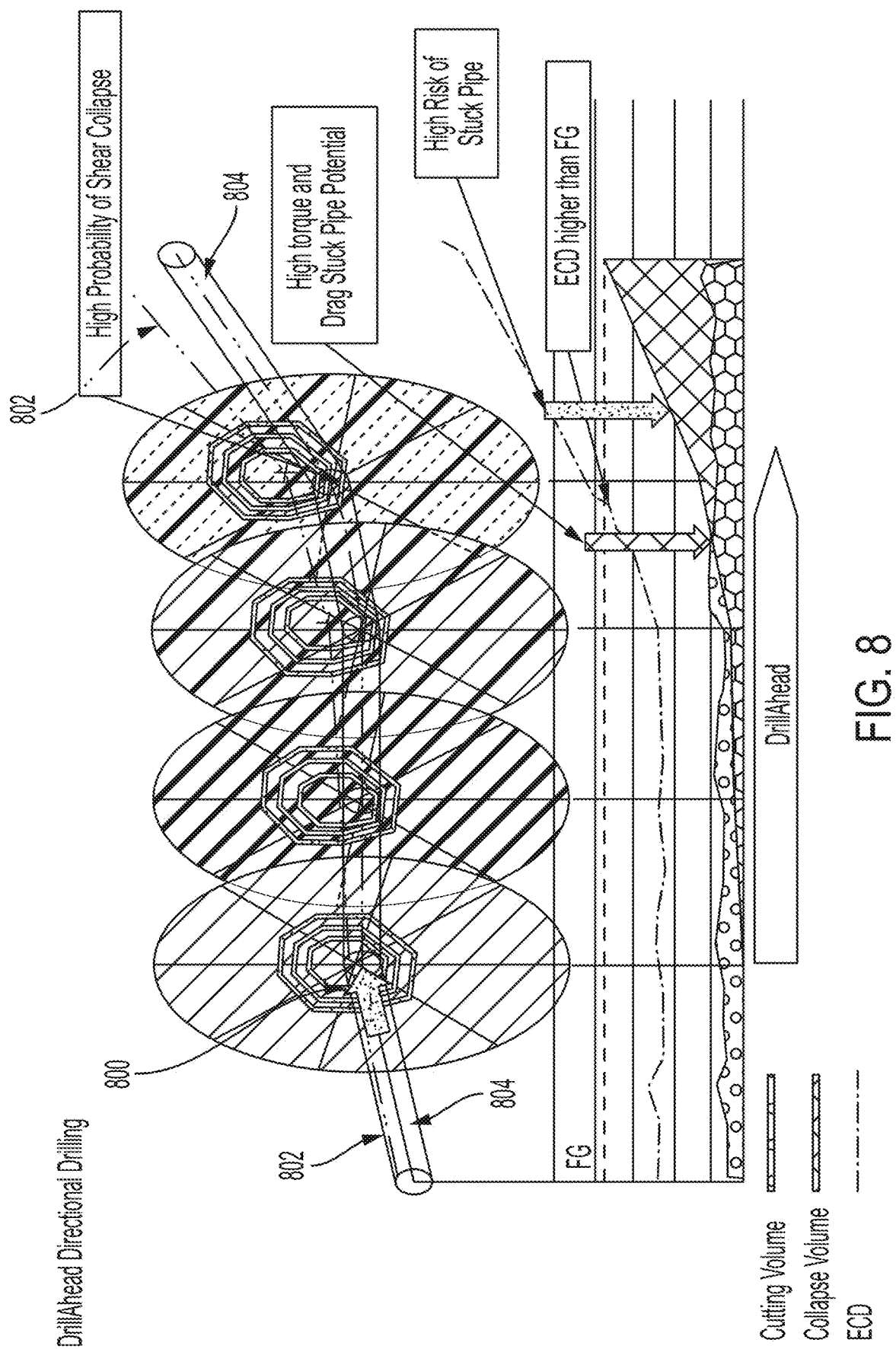
FIG. 8 is a diagram of a wellbore trajectory based on caving volume estimations according to one example of the present disclosure.

FIG. 8 is a diagram of a wellbore trajectory based on caving volume estimations 224 according to one example of the present disclosure. A bit 800 may be used to drill in a planned trajectory 802. However, the trajectory 802 may be adjusted in real-time based on real-time determinations of caving volume estimations 224, and the direction of the bit 800 may be altered to follow an optimized trajectory 804. The bit 800 following the optimized trajectory 804 may reduce the likelihood of failure events, such as shear collapse events, where the effective circulating density is below shear collapse pressure, or stuck pipe events. The real-time data may be used to calculate an estimated caving volume. Cavings in the wellbore due to breakouts may affect wellbore conditions, such as effective circulating density. Real-time estimates of a caving volume are critical information to evaluate if drilling parameters, such as mud weight, are optimal to prevent wellbore shear failure. The drilling parameters, including drilling fluid density, rotations per minute, a pump rate, a lubrication concentration, a loss circulation volume, a rate of penetration, a weight on bit, an azimuth inclination, may be adjusted based on the caving volume estimations 224.

In some aspects, system, method, and non-transitory computer-readable medium for drilling parameter optimization in real-time are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a memory that includes instructions executable by the processor for causing the processor to: receive image log data measured during a drilling operation in a wellbore; receive an identification of a breakout in a subterranean formation around the wellbore; determine, using the image log data, a breakout angular width for the breakout; determine a breakout depth for the breakout; determine a caving volume estimation based on the breakout depth and the breakout angular width substantially contemporaneously with the drilling operation; and output the caving volume estimation for use in substantially contemporaneously adjusting a drilling parameter for the drilling operation.

Example 2 is the system of example 1, wherein the memory further comprises instructions executable by the processor for causing the processor to automatically identify the breakout based on the image log data.

Example 3 is the system of any of example(s) 1-2, wherein the memory further comprises instructions executable by the processor for causing the processor to determine the breakout depth for the breakout using the image log data.

Example 4 is the system of any of example(s) 1-3, wherein the memory further comprises instructions executable by the processor for causing the processor to: divide the wellbore into a plurality of intervals; for each interval of the plurality of intervals: determine, using a geomechanical model of the wellbore, a breakout depth for the breakout; and determine, using the breakout depth, a breakout area for the breakout; and determine, using the breakout area determined for each interval of the plurality of intervals, the caving volume estimation for the breakout.

Example 5 is the system of any of example(s) 1-4, wherein the drilling parameter comprises at least one of a drilling fluid density, rotations per minute, a pump rate, a lubrication concentration, a loss circulation volume, a rate of penetration, a weight on bit, an azimuth inclination, and a well trajectory.

Example 6 is the system of any of example(s) 1-5, wherein the memory further comprises instructions executable by the processor for causing the processor to: receive drilling data measured in real time during the drilling operation, the drilling data comprising at least one of torque data, drag data, weight-on-bit data, equivalent circulating density data, rate of penetration data, rotations per minute, pressure while drilling data, standpipe pressure data, pump rate data, drilling events data, and solid volume at surface data; and determine the caving volume estimation using the drilling data.

Example 7 is the system of any of example(s) 1-6, wherein the memory further comprises instructions executable by the processor for causing the processor to: receive logging data measured in real time during the drilling operation, the logging data comprising at least one of gamma ray log data, sonic log data, resistivity log data, and density log data; and determine the caving volume estimation using the logging data.

Example 8 is a method comprising: receiving, by a processor, image log data measured during a drilling operation in a wellbore; receiving, by the processor, an identification of a breakout in a subterranean formation around the wellbore; determining, by the processor and using the image log data, a breakout angular width for the breakout; determining a breakout depth for the breakout; determining, by the processor, a caving volume estimation based on the breakout depth and the breakout angular width substantially contemporaneously with the drilling operation; and outputting, by the processor, the caving volume estimation for use in substantially contemporaneously adjusting a drilling parameter for the drilling operation in real time.

Example 9 is the method of example 8, further comprising: automatically identifying the breakout based on the image log data.

Example 10 is the method of any of example(s) 8-9, wherein determining the breakout depth for the breakout comprises determining the breakout depth using the image log data.

Example 11 is the method of any of example(s) 8-10, further comprising: dividing the wellbore into a plurality of intervals; for each interval of the plurality of intervals: determining, using a geomechanical model of the wellbore, a breakout depth for the breakout; and determining, using the breakout depth, a breakout area for the breakout; and determining, using the breakout area determined for each interval of the plurality of intervals, the caving volume estimation for the breakout.

Example 12 is the method of any of example(s) 8-11, wherein the drilling parameter includes at least one of a drilling fluid density, rotations per minute, a pump rate, a lubrication concentration, a loss circulation volume, a rate of penetration, a weight on bit, an azimuth inclination, and a well trajectory.

Example 13 is the method of any of example(s) 8-12, further comprising: receiving drilling data measured in real time during the drilling operation, the drilling data including at least one of torque data, drag data, weight-on-bit data, equivalent circulating density data, rate of penetration data, rotations per minute, pressure while drilling data, standpipe pressure data, pump rate data, drilling events data, and solid volume at surface data; and determining the caving volume estimation using the drilling data.

Example 14 is the method of any of example(s) 8-13, further comprising: receiving logging data measured in real time during the drilling operation, the logging data including at least one of gamma ray log data, sonic log data, resistivity log data, and density log data; and determining the caving volume estimation using the logging data.

Example 15 is a non-transitory computer-readable medium comprising instructions that are executable by a processor for causing the processor to perform operations comprising: receiving image log data measured during a drilling operation in a wellbore; receiving an identification of a breakout in a subterranean formation around the wellbore; determining, using the image log data, a breakout angular width for the breakout; determining a breakout depth for the breakout; determining a caving volume estimation based on the breakout depth and the breakout angular width substantially contemporaneously with the drilling operation; and outputting the caving volume estimation for use in substantially contemporaneously adjusting a drilling parameter for the drilling operation.

Example 16 is the non-transitory computer-readable medium of example 15, wherein the operations further comprise: automatically identifying the breakout based on the image log data.

Example 17 is the non-transitory computer-readable medium of any of example(s) 15-16, wherein determining the breakout depth for the breakout further comprises using the image log data to determine the breakout depth.

Example 18 is the non-transitory computer-readable medium of any of example(s) 15-17, wherein the operations further comprise: dividing the wellbore into a plurality of intervals; for each interval of the plurality of intervals: determining, using a geomechanical model of the wellbore, a breakout depth for the breakout; and determining, using the breakout depth, a breakout area for the breakout; and determining, using the breakout area determined for each interval of the plurality of intervals, the caving volume estimation for the breakout.

Example 19 is the non-transitory computer-readable medium of any of example(s) 15-18, wherein the drilling parameter comprises at least one of a drilling fluid density, rotations per minute, a pump rate, a lubrication concentration, a loss circulation volume, a rate of penetration, a weight on bit, an azimuth inclination, and a well trajectory.

Example 20 is the non-transitory computer-readable medium of any of example(s) 15-19, wherein the operations further comprise: receiving drilling data measured in real time during the drilling operation, the drilling data comprising at least one of torque data, drag data, weight-on-bit data, equivalent circulating density data, rate of penetration data, rotations per minute, pressure while drilling data, standpipe pressure data, pump rate data, drilling events data, and solid volume at surface data; and determining the caving volume estimation using the drilling data.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processor; and
a memory that includes instructions executable by the processor for causing the processor to:
receive image log data measured during a drilling operation in a wellbore;
receive an identification of a breakout in a subterranean formation around the wellbore;
determine, using the image log data, a breakout angular width for the breakout;
determine a breakout depth for the breakout;
determine a caving volume estimation based on the breakout depth and the breakout angular width substantially contemporaneously with the drilling operation;
output the caving volume estimation;
determine an adjustment to a wellbore trajectory for the drilling operation based on the caving volume estimation; and
adjust the wellbore trajectory for the drilling operation in the wellbore based on the adjustment.

2. The system of claim 1, wherein the memory further comprises instructions executable by the processor for causing the processor to automatically identify the breakout based on the image log data.

3. The system of claim 1, wherein the memory further comprises instructions executable by the processor for causing the processor to determine the breakout depth for the breakout using the image log data.

4. The system of claim 1, wherein the memory further comprises instructions executable by the processor for causing the processor to:
divide the wellbore into a plurality of intervals;
for each interval of the plurality of intervals:
determine, using a geomechanical model of the wellbore, the breakout depth for the breakout; and
determine, using the breakout depth, a breakout area for the breakout; and
determine, using the breakout area determined for each interval of the plurality of intervals, the caving volume estimation for the breakout.

5. The system of claim 1, wherein the memory further comprises instructions executable by the processor for causing the processor to:
determine another adjustment to a drilling parameter for the wellbore operation, wherein the drilling parameter comprises at least one of a drilling fluid density, rotations per minute, a pump rate, a lubrication concentration, a loss circulation volume, a rate of penetration, a weight on bit, an azimuth inclination, and a well trajectory; and
adjust the drilling parameter for the drilling operation in the wellbore based on the other adjustment.

6. The system of claim 4, wherein the memory further comprises instructions executable by the processor for causing the processor to determine the breakout area by:
receiving drilling data measured in real time during the drilling operation, the drilling data comprising at least one of torque data, drag data, weight-on-bit data, equivalent circulating density data, rate of penetration data, rotations per minute, pressure while drilling data, standpipe pressure data, pump rate data, drilling events data, and solid volume at surface data; and
determining the breakout area using the drilling data.

7. The system of claim 4, wherein the memory further comprises instructions executable by the processor for causing the processor to determine the breakout area by:
receiving logging data measured in real time during the drilling operation, the logging data comprising at least one of gamma ray log data, sonic log data, resistivity log data, and density log data; and
determining the breakout area using the logging data.

8. A method comprising:
receiving, by a processor, image log data measured during a drilling operation in a wellbore;
receiving, by the processor, an identification of a breakout in a subterranean formation around the wellbore;
determining, by the processor and using the image log data, a breakout angular width for the breakout;
determining a breakout depth for the breakout;
determining, by the processor, a caving volume estimation based on the breakout depth and the breakout angular width substantially contemporaneously with the drilling operation;
outputting, by the processor, the caving volume estimation;
determining, by the processor, an adjustment to a wellbore trajectory for the drilling operation based on the caving volume estimation; and
adjusting the wellbore trajectory for the drilling operation in the wellbore based on the adjustment.

9. The method of claim 8, further comprising:
automatically identifying the breakout based on the image log data.

10. The method of claim 8, wherein determining the breakout depth for the breakout comprises determining the breakout depth using the image log data.

11. The method of claim 8, further comprising:
dividing the wellbore into a plurality of intervals;
for each interval of the plurality of intervals:
determining, using a geomechanical model of the wellbore, the breakout depth for the breakout; and
determining, using the breakout depth, a breakout area for the breakout; and
determining, using the breakout area determined for each interval of the plurality of intervals, the caving volume estimation for the breakout.

12. The method of claim 8, further comprising:
determining another adjustment to a drilling parameter for the wellbore operation, wherein the drilling parameter includes at least one of a drilling fluid density, rotations per minute, a pump rate, a lubrication concentration, a loss circulation volume, a rate of penetration, a weight on bit, an azimuth inclination, and a well trajectory; and
adjusting the drilling parameter for the drilling operation in the wellbore based on the other adjustment.

13. The method of claim 11, wherein determining the breakout area further comprises:
receiving drilling data measured in real time during the drilling operation, the drilling data including at least one of torque data, drag data, weight-on-bit data, equivalent circulating density data, rate of penetration data, rotations per minute, pressure while drilling data, standpipe pressure data, pump rate data, drilling events data, and solid volume at surface data; and
determining the breakout area using the drilling data.

14. The method of claim 11, wherein determining the breakout area further comprises:
receiving logging data measured in real time during the drilling operation, the logging data including at least one of gamma ray log data, sonic log data, resistivity log data, and density log data; and
determining the breakout area using the logging data.

15. A non-transitory computer-readable medium comprising instructions that are executable by a processor for causing the processor to perform operations comprising:
receiving image log data measured during a drilling operation in a wellbore;
receiving an identification of a breakout in a subterranean formation around the wellbore;
determining, using the image log data, a breakout angular width for the breakout;
determining a breakout depth for the breakout;
determining a caving volume estimation based on the breakout depth and the breakout angular width substantially contemporaneously with the drilling operation;
outputting the caving volume estimation;
determining an adjustment to a wellbore trajectory for the drilling operation based on the caving volume estimation; and
adjusting the wellbore trajectory for the drilling operation in the wellbore based on the adjustment.

16. The non-transitory computer-readable medium of claim 15, wherein the operations further comprise:
automatically identifying the breakout based on the image log data.

17. The non-transitory computer-readable medium of claim 15, wherein determining the breakout depth for the breakout further comprises using the image log data to determine the breakout depth.

18. The non-transitory computer-readable medium of claim 15, wherein the operations further comprise:
dividing the wellbore into a plurality of intervals;
for each interval of the plurality of intervals:
determining, using a geomechanical model of the wellbore, the breakout depth for the breakout; and
determining, using the breakout depth, a breakout area for the breakout; and
determining, using the breakout area determined for each interval of the plurality of intervals, the caving volume estimation for the breakout.

19. The non-transitory computer-readable medium of claim 15, wherein determining the breakout area further comprises:
receiving drilling data measured in real time during the drilling operation, the drilling data comprising at least one of torque data, drag data, weight-on-bit data, equivalent circulating density data, rate of penetration data, rotations per minute, pressure while drilling data, standpipe pressure data, pump rate data, drilling events data, and solid volume at surface data; and
determining the breakout area using the drilling data.

20. The non-transitory computer-readable medium of claim 15, wherein determining the breakout area further comprises:
receiving logging data measured in real time during the drilling operation, the logging data comprising at least one of gamma ray log data, sonic log data, resistivity log data, and density log data; and
determining the breakout area using the logging data.

* * * * *